United States Patent
Göktepe et al.

(10) Patent No.: US 11,711,177 B2
(45) Date of Patent: Jul. 25, 2023

(54) CONTROL MESSAGE RECEPTION AT A RECEIVER

(71) Applicant: Fraunhofer-Gesellschaft zur Förderung der angewandten Forschung e.V., Munich (DE)

(72) Inventors: Baris Göktepe, Berlin (DE); Thomas Fehrenbach, Berlin (DE); Cornelius Hellge, Berlin (DE); Robin Thomas, Berlin (DE); Thomas Wirth, Berlin (DE); Thomas Schierl, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 338 days.

(21) Appl. No.: 16/992,944

(22) Filed: Aug. 13, 2020

(65) Prior Publication Data

US 2020/0374051 A1    Nov. 26, 2020

Related U.S. Application Data

(63) Continuation of application No. PCT/EP2019/053737, filed on Feb. 14, 2019.

(30) Foreign Application Priority Data

Feb. 15, 2018    (EP) .................. 18156975

(51) Int. Cl.
*H04L 1/00*    (2006.01)
*H04L 1/22*    (2006.01)
*H04L 1/1812*    (2023.01)

(52) U.S. Cl.
CPC .............. *H04L 1/22* (2013.01); *H04L 1/0026* (2013.01); *H04L 1/0061* (2013.01); *H04L 1/1816* (2013.01)

(58) Field of Classification Search
CPC ....... H04L 1/22; H04L 1/0026; H04L 1/0061; H04L 1/1816
See application file for complete search history.

(56) References Cited

U.S. PATENT DOCUMENTS 9,509,479 B2 * 11/2016 Yi ...................... H04L 5/0055
2009/0238091 A1 * 9/2009 Kim .................... H04L 5/0053
                                                                370/252

(Continued)

FOREIGN PATENT DOCUMENTS

CN        2882789 Y    5/2014
CN      107113787 A    8/2017

(Continued)

OTHER PUBLICATIONS

"Intel Corporation, Satisfying ultra-reliability targets for NR PDCCH", 3GPP TSG RAN WG1 adhoc NR_AH_1706 R1-1710550, Jun. 17, 2017, [search date: Jan. 16, 2018], Internet<URL:http://www.3gpp.org/ftp/tsg_ran/WG1_RL1/TSG12R1_AH/NR_AH_1706/Docs/R1-1710550.zip>.

(Continued)

*Primary Examiner* — Christine T. Tu
(74) *Attorney, Agent, or Firm* — Perkins Coie LLP; Michael A. Glenn

(57) ABSTRACT

A receiver receives a radio signal from a transmitter of a wireless communication system serving a plurality of receivers. The radio signal includes for the plurality of receivers served by the transmitter a plurality of control messages and a redundant control message for at least one of the control messages. The receiver detects a control message from the radio signal, and, responsive to detecting the control message, the receiver detects a signal from another location in the radio signal. The receiver determines the detected control message as a specific control message (Continued)

for the receiver based on the signal detected from the other location.

28 Claims, 12 Drawing Sheets

(56) References Cited

U.S. PATENT DOCUMENTS

| | | | |
|---|---|---|---|
| 2013/0294547 A1* | 11/2013 | Lane | H04L 27/2647 375/340 |
| 2014/0334403 A1 | 11/2014 | Park et al. | |
| 2014/0376461 A1 | 12/2014 | Park et al. | |
| 2017/0318565 A1 | 11/2017 | Golitschek Edler Von Elbwart et al. | |
| 2018/0084559 A1 | 3/2018 | Kim et al. | |
| 2019/0150164 A1* | 5/2019 | Nam | H04L 1/1896 370/329 |

FOREIGN PATENT DOCUMENTS

| | | |
|---|---|---|
| CN | 107466451 A | 12/2017 |
| JP | 2009212598 A | 9/2009 |
| JP | 2016540408 A | 12/2016 |
| TW | 201347476 A | 11/2013 |

OTHER PUBLICATIONS

"Intel Corporation, Ultra-reliability for NR PDCCH[online], 3GPP TSG RAN WG1", #90b R1-1717381, Oct. 3, 2017, [search date: Jul. 13, 2018], InternetURL:http://www.3gpp.org/ftp/tsg_ran/WG1_RL1/TSGR1_90b/Docs/R1-1717381.zip.

3GPP TR 38.811 V0.2.0, 3rd Generation Partnership Project; Technical Specification Group Radio Access Network; Study on New Radio (NR) to support Non Terrestrial Networks (Release 15), Sep. 2017.

Huawei, HiSilicon, "Design impact on reliability for LTE URLLC", R1-1719503, 3GPP TSG RAN WG1 Meeting #91, Reno, Nevada, USA, Nov. 27-Dec. 1, 2017.

Huawei, HiSilicon, "NTN Channel Modeling", 3GPP Technical Document-R1-1719844, 3GPP TSG RAN WG1 Meeting #91, Reno, USA, Nov. 27-Dec. 1, 2017.

Intel Corporation, "Ultra-reliability for NR PDCCH", vol. RAN WG1, No. Prague, Czech Republic; Oct. 9, 2017-Oct. 13, 2017, Oct. 8, 2017 (Oct. 8, 2017), 3GPP Draft; R1-1717381 Intel—DL_Control_URLLC, 3rd Generation Partnership Project (3GPP), Mobile Competence Centre ; 650, Route Des Lucioles ; F-06921 Sophia-Antipolis Cedex ; France, Retrieved from the Internet: URL:http://www.3gpp.org/ftp/Meetings_3GPP_SYNC/RAN1/Docs/, XP051340571.

Intel Corporation, "Satisfying ultra-reliability targets for NR PDCCH", vol. RAN WG1, No. Qingdao, P.R. China; Jun. 27, 2017-Jun. 30, 2017, Jun. 26, 2017 (Jun. 26, 2017), 3GPP Draft; R1-1710550 Intel—DL_Control_URLLC, 3rd Generation Partnership Project (3GPP), Mobile Competence Centre ; 650, Route Des Lucioles ; F-06921 Sophia-Antipolis Cedex ; France, Retrieved from the Internet: URL:http://www.3gpp.org/ftp/Meetings_3GPP_SYNC/RAN1/Docs/, XP051299757.

"ZTE, RI-1718883 Offline Summary for AI7.6 NR UL power control_ZTE_vS"3GPP tsg_ran\WG1_RL1 2017.

* cited by examiner

| field name | length (bits) | comment |
|---|---|---|
| resource allocation header | 1 | RA Type 0 or RA Type 1 |
| duplication offset (number of CCEs) | 6 | Size depends on aggregation level and bandwidth |
| resource block assignment for RA Type 0 | 6 (1.4 Mhz) 8 (3 Mhz) 13 (5 Mhz) 17 (10 Mhz) 19 (15 Mhz) 25 (20 Mhz) | applicable only when Resource allocation header = 0 (RA Type 0) Refer to RA Type page |
| subset | N/A (1.4 Mhz) 1 (3 Mhz) 1 (5 Mhz) 2 (10 Mhz) 2 (15 Mhz) 2 (20 Mhz) | applicable only when Resource allocation header = 1 (RA Type 1) Refer to RA Type page |
| shift | N/A (1.4 Mhz) 1 (3 Mhz) 1 (5 Mhz) 1 (10 Mhz) 1 (15 Mhz) 1 (20 Mhz) | applicable only when Resource allocation header = 1 (RA Type 1) Refer to RA Type page |
| resource block assignment for RA Type 1 | N/A (1.4 Mhz) 6 (3 Mhz) 13 (5 Mhz) 14 (10 Mhz) 16 (15 Mhz) 22 (20 Mhz) | applicable only when Resource allocation header = 1 (RA Type 1) Refer to RA Type page |
| MCS | 5 | |
| HARQ Process | 3 (FDD) 4 (TDD) | |
| RV | 2 | |
| TPC for PUCCH | 2 | see Power Control section |

Fig. 7

CONTROL MESSAGE RECEPTION AT A RECEIVER

CROSS-REFERENCE TO RELATED APPLICATIONS

This application is a continuation of copending International Application No. PCT/EP2019/053737, filed Feb. 14, 2019, which is incorporated herein by reference in its entirety, and additionally claims priority from European Application No. 18156975.7, filed Feb. 15, 2018, which is also incorporated herein by reference in its entirety.

The present application relates to the field of wireless communication networks or systems, more specifically to systems providing for an ultra-reliable communication. Embodiments relate to an approach allowing a receiver or a user equipment, UE, to evaluate whether a control message received from a transmitter, like a base station or like another UE, is actually a control message which is intended for this specific UE.

BACKGROUND OF THE INVENTION

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device and can be referred to as user equipment (UE), user terminal or mobile terminal (MT). Further, the wireless communication system may be accessed by mobile or stationary Internet-of-Things (IoT) devices which connect to a base station or to a user equipment. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network (CN) 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements or logical channels to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. In another example, two UEs are communicating in a direct mode (D2D). In LTE networks, this interface is defined as PC5. Here, the physical channels include sidelink control information (SCI) carried over a physical sidelink control channel (PSCCH), and user data, transmitted via physical sidelink data channel (PSDCH).

The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells.

In addition to the above described terrestrial wireless network also non-terrestrial wireless communication networks exist. FIG. 2 is a schematic representation of an example of a non-terrestrial wireless communication network 150 including a core network 152 and a radio access network 154. Other than the terrestrial wireless network of FIG. 1, the non-terrestrial wireless network 150 includes a plurality of spaceborne transceivers 156, like satellites, and/or airborne transceivers 158, like unmanned aircraft systems. The respective spaceborne or airborne transceivers 156, 158 may be implemented in respective spaceborne or airborne vehicles, like the above mentioned satellites or unmanned aircraft systems. The transceivers 156 and 158 are provided to serve one or more users, like the UE or the IoT device 110 shown in FIG. 2, which are provided on or above ground 160. The UE and the IoT device may be devices as described above with reference to FIG. 1. The arrows $158_1$ to $158_4$ schematically represent uplink/downlink connections for communicating data between the user UE, 110 and the respective transceiver 156, 158. The transceivers 156, 158 are connected to the core network 152 as is schematically represented by the arrows $162_1$, $162_2$. The above described non-terrestrial wireless communication network or system may operate in a similar way as the terrestrial system described above with reference to FIG. 1, for example in accordance with the LTE-Advanced Pro standard or the 5G or NR, New Radio, standard.

In wireless communication networks as described above, various services may be implemented. Some services may need an ultra-reliable communication, for example ultra-reliable low latency communication, URLLC, or highly-reliable low latency communication, HRLLC, services. URLLC targets a high reliability at very low latencies so that systems implementing ultra-low latency services support round trip time, RTT, latencies of only a few milliseconds, for example 1 ms RTT. To address such short RTT latencies, known approaches use the above mentioned short transmission time intervals, sTTIs. While the reduced RTT addresses the latency issue, there is still the reliability issue which is closely related to the reliability of the control information received at the UE. While improving the data channel may be straight-forward, for example by lowering the code rate and/or by adapting the modulation and coding scheme, this is not so straight-forward in the control channel. For example, the supported lowest code rate in the physical downlink control channel, PDCCH, may be limited due to the substantially fixed, less flexible structure of the PDCCH. With regard to the receipt of control messages in the control channel, the missing probability and the false positive probability are to be observed, especially for ultra-reliable service or for URLLC services. The missing probability is the probability to miss a control message, like a DCI message, in the control channel, and the false positive probability is the probability to erroneously detect or identify a control message not intended for the UE, which may happen, for example, in case a of blind decoding process that produces a valid CRC (see below) although the signal detected was no DCI message for the UE. Note, in case of the LTE technology (LTE, LTE-A, LTE-A Pro), due to backwards compatibility reasons, choosing a different channel coding scheme to better support URLLC services is not possible. This would break the compatibility with existing LTE user terminals. Furthermore, the techniques proposed in this invention can equally be applied to future radio standards, e.g. 5G NR, and thus bring reliability enhancements to future cellular technologies.

A downlink, DL, radio frame in a wireless communication network includes a PDCCH region which defines the locations or places where a specific PDCCH may be located. The PDCCH region is searched by the UEs upon receiving a signal. Each PDCCH carries a control message, like the downlink control information, DCI, which is identified by the UE-specific radio network temporary identifier, RNTI. The RNTI is encoded, for example, in the CRC attachment of the DCI. The CRC of the DCI may be scrambled with the UE-specific RNTI, like the C-RNTI. FIG. 3 schematically illustrates an example of a PDCCH region having a plurality of PDCCHs formed of different numbers of control-channel elements, CCEs. Depending on the payload size of the DCI format to be transmitted and the channel conditions, the base station may select an appropriate aggregation level defining the number of CCEs to be used for transmitting the DCI packet. In NR (5G), the control message is located in the PDCCH, including one or more control-channel elements, CCEs within a control-resource set, CORESET.

As can be seen from FIG. 3, the PDCCH search space is divided into a common search space, that may be monitored by all UEs which are served by a base station, and into a UE-specific search space that is monitored by at least one UE. Each UE performs a blind decoding on the whole PDCCH region so as to find one or more DCI packets dedicated for this UE. The DCI packets indicate, for example, the resources and other parameters to be used during an upcoming data transmission.

As mentioned above, a UE may obtain its one or more DCI packages by searching the PDCCH region which includes a blind decoding/blind detection approach. FIG. 4 schematically illustrates the blind decoding process to find within the PDCCH region one or more DCI packages for a specific UE. FIG. 4 schematically illustrates the PDCCH region 200, also referred to as the PDCCH search space. Five DCI packages $DCI_1$ to $DCI_5$ are illustrated in the PDCCH search space 200, and a specific UE including an appropriate decoder searches the PDCCH search space 200 for a valid CRC to find DCI packets for this specific UE. As it is depicted in FIG. 4, the convolutional decoder obtains from DCI package $DCI_2$ the data including the control data and the scrambled CRC. The control data and the scrambled CRC are separated, the scrambled CRC is descrambled using the UE specific RNTI, the resulting CRC is checked against the CRC calculated from the control data, and a match of the resulting CRC and the calculated CRC indicates that the DCI package $DCI_2$ is actually the control message for the UE which decoded the control message.

However, the blind decoding approach described above may also find a match due to a wrong decoding resulting in random data in the PDCCH search space, i.e., data not representing a DCI message for the specific UE may be erroneously detected as a valid control message, also referred to as a false-positive DCI. Such a false decoding may occur with a probability of approx. $P_{FA}=1-(1-2^{-16})^M$, where M is the number of blind detection attempts carried out by the UE. For example, in wireless communication systems as described above the probability for such a false alarm rate is very low, approx. $10^{-4}$ (see e.g., 3GPP TDOC R1-1719503: Design Impact on Reliability for LTE URLLC). In other words, when a control messages decoded from a control region of a radio signal by a receiver, like a UE, may be decoded erroneously, i.e., is actually not a control message for this UE, with a probability of approx.

$10^{-4}$. Basically, this is not a problem for standard or regular communication services. However, ultra-reliable communication services may need a probability for a packet error to be as low as $10^{-5}$ so that a false-positive DCI detected with a probability of approx. $10^{-4}$ causes a problem as the UE, on the basis of the false-positive DCI, which may be a control message for another UE, causes the UE to configure itself for a data transmission on resources where no data for the UE is received so that the data transmission towards the UE may not be successful. This may lead to an additional delay until the UE, for example, in a subsequent downlink frame, decodes a correct or true-positive DCI allowing the UE to set its parameters for receiving data from the base station on the correct resources. Clearly, while such a delay might not be an issue in conventional or standard communication services, in services needing an ultra-reliable communication such decoding/detection of false-positive control messages may increase the delay. Furthermore, this erroneous processing involves processing resources and thus drains the UE's battery power.

It is noted that the information in the above section is only for enhancing the understanding of the background of the invention and therefore it may contain information that does not form conventional technology that is already known to a person of ordinary skill in the art.

SUMMARY

An embodiment may have a receiver, wherein the receiver is configured to receive a radio signal from a transmitter of a wireless communication system serving a plurality of receivers, the radio signal including for the plurality of receivers served by the transmitter a plurality of control messages and a redundant control message for at least one of the control messages, wherein the receiver is configured to detect a control message from the radio signal, wherein the receiver is configured to detect, responsive to detecting the control message, a signal from another location in the radio signal, and wherein the receiver is configured to determine the detected control message as a specific control message for the receiver based on the signal detected from the other location.

Another embodiment may have a transmitter, wherein the transmitter is configured to serve a plurality of receivers of a wireless communication system, and wherein the transmitter is configured to provide a radio signal, the radio signal including for the plurality of receivers served by the transmitter a plurality of control messages and a redundant control message for at least one of the control messages.

According to another embodiment, a wireless communication system may have: one or more inventive receivers, and one or more inventive transmitters.

According to another embodiment, a method may have the steps of: receiving a radio signal from a transmitter of a wireless communication system serving a plurality of receivers, the radio signal including for the plurality of receivers served by the transmitter a plurality of control messages and a redundant control message for at least one of the control messages, detecting a control message from the radio signal, responsive to detecting the control message, detecting a signal from another location in the radio signal, and determining the detected control message as a specific control message for the receiver based on the signal detected from the other location.

According to another embodiment, a method may have the steps of: serving a plurality of receivers of a wireless communication system by a transmitter, and sending, by the transmitter, a radio signal, the radio signal including for the plurality of receivers served by the transmitter a plurality of control messages and a redundant control message for each of the control messages.

According to another embodiment, a method may have the steps of: serving a plurality of receivers of a wireless communication system by a transmitter, sending, by the transmitter, a radio signal, the radio signal including for the plurality of receivers served by the transmitter a plurality of control messages and a redundant control message for each of the control messages, detecting a control message from the radio signal, responsive to detecting the control message, detecting a signal from another location in the radio signal, and determining the detected control message as a specific control message for the receiver based on the signal detected from the other location.

Another embodiment may have a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which:

FIG. 6(a)-FIG. 6(b) shows a mapping between two PDCCH regions and how a UE combines a DCI and a signal from the two PDCCH regions for determining whether a DCI for the UE is valid or not, wherein FIG. 6(a) illustrates a scenario in which the UE accepts a DCI message as a valid DCI message, and FIG. 6(b) illustrates a scenario in which a UE rejects a DCI message as a false-positive DCI message;

FIG. 7 illustrates a DCI format message based on a known DCI format 1 message modified in accordance with an embodiment of the present invention;

FIG. 9(a)-FIG. 9(b) illustrates embodiments for arranging multiple duplicates of the control message in the control region, wherein FIG. 9(a) shows a comb-structure, and FIG. 9(b) shows a n-offset structure;

DETAILED DESCRIPTION OF THE INVENTION

Figure 1:
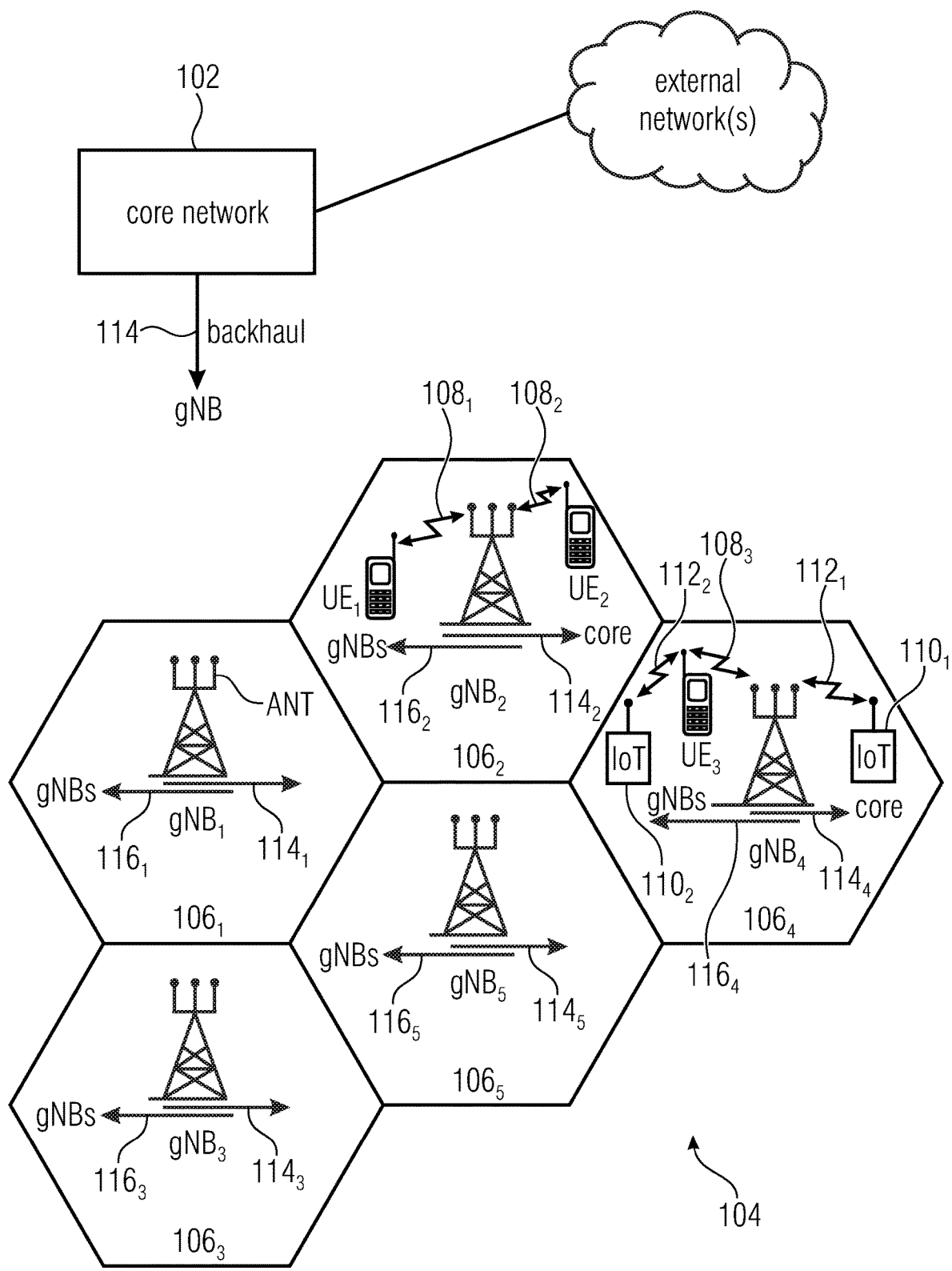
FIG. 1 shows a schematic representation of an example of a terrestrial wireless communication system.

Embodiments of the present invention are now described in more detail with reference to the accompanying drawings in which the same or similar elements have the same reference signs assigned.

To address the problem of erroneously detecting data from a control region of a radio signal leading to a false-positive control message for the decoding UE, in accordance with the inventive approach, for a receiver, UE, one or more duplicated packets of the same control message, like a DCI, are included into the radio signal. Each control message may be uniquely identifiable, for example, by the UE's C-RNTI as described above. Once the UE detected a control message in the control region, on the basis of information known at the UE, for example on the basis of information being preconfigured in the UE or on the basis of information derived from the detected control message, the UE reads a signal from a location in the control region indicated by the information. On the basis of this signal the UE evaluates the detected control message so as to determine as to whether the control DCI message is valid or invalid, e.g., is a true-positive DCI (valid) or false-positive DCI (invalid) message for the decoding UE. For example, the detected DCI message and the signal may be combined or correlated so that on the basis of the combined message or the correlation value the validity of the detected DCI message may be evaluated.

For implementing the above summarized inventive approach, a receiver, a transmitter, a wireless communication network and methods as described below are provided.
Receiver The present invention provides a receiver,
wherein the receiver is configured to receive a radio signal from a transmitter of a wireless communication system serving a plurality of receivers, the radio signal including for the plurality of receivers served by the transmitter a plurality of control messages and a redundant control message for at least one of the control messages,
wherein the receiver is configured to detect a control message from the radio signal,
wherein the receiver is configured to detect, responsive to detecting the control message, a signal from another location in the radio signal, and
wherein the receiver is configured to determine the detected control message as a specific control message for the receiver based on the signal detected from the other location.

The present invention provides a method, comprising:
receiving a radio signal from a transmitter of a wireless communication system serving a plurality of receivers, the radio signal including for the plurality of receivers served by the transmitter a plurality of control messages and a redundant control message for at least one of the control messages,
detecting a control message from the radio signal,
responsive to detecting the control message, detecting a signal from another location in the radio signal, and
determining the detected control message as a specific control message for the receiver based on the signal detected from the other location.

In accordance with embodiments, to determine the detected control message as the specific control message, the receiver is configured to combine or correlate the detected control message and the signal detected from the other location.

In accordance with embodiments, the receiver is configured to
determine that the detected control message is the specific control message in case the combination of the detected control message and the signal detected from the other location has a signal quality higher than or equal to a signal quality of the detected control message and/or yields a decodable message, and
determine that the detected control message is not the specific control message in case the combination of the detected control message and the signal detected from the other location has a signal quality less than a signal quality of the detected control message and/or yields a non-decodable message, e.g., a resulting sequence does not match the first one and/or the CRC check does not pass.

In accordance with embodiments, the receiver is configured to
determine that the detected control message is the specific control message in case the correlation of the detected control message and the signal detected from the other location yields a value equal to or exceeding a predefined threshold and
determine that the detected control message is not the specific control message in case the correlation of the detected control message and the signal detected from the other location yields a value below the predefined threshold.

In accordance with embodiments, the redundant control message comprises
a certain redundancy version of the control message to provide for an incremental redundancy, or
an error correction code for the control message, or
a duplicate of the control message.

In accordance with embodiments,
in case the control message and the redundant control message are in a common control region of the radio signal, the other location indicates an offset in time and/or frequency and/or spatial domain relative to the detected control message in the common control region, or relative to a border of the common control region, and
in case the control message is in a first control region of the radio signal and the redundant control message is in a second control region of the radio signal, the other location indicates an offset in time and/or frequency and/or spatial domain relative to a border of the second control region.

In accordance with embodiments,
the radio signal comprises a first radio signal, which defines a first link between the transmitter and the receiver, and a second radio signal, which defines a second link between the transmitter and the receiver,
wherein common control region is part of one of the first and second radio signals, or is part of both radio signals, and
wherein the first control region is part one of the first and second radio signals, and the second control region is part of the other one of the first and second radio signals.

In accordance with embodiments, the offset defines an offset in time and/or frequency and/or space, or defines an offset in a number of control message elements, each control message being formed of one or more control message elements, e.g., Control Channel Elements (CCE) or aggregation levels (AL).

In accordance with embodiments, the receiver is preconfigured with the other location, or wherein the other location is indicated in the control message.

In accordance with embodiments, the control message explicitly indicates the other location or includes a reference to one of a plurality of preconfigured locations.

In accordance with embodiments,
the radio signal includes at least one further redundant control message for a control message, and
the receiver is configured to detect from at least one further location in the radio a further signal, and to determine the detected control message as the specific control message for the receiver based on the signal detected from the other location and/or the further signal detected from the at least one further location.

In accordance with embodiments, the further redundant control message comprises
a certain redundancy version of the control message to provide for an incremental redundancy, or
an error correction code for the control message, or
a duplicate of the control message.

In accordance with embodiments, the redundant control message comprises a first redundancy version of the control message, and wherein respective further redundant control messages comprise respective further redundancy versions.

In accordance with embodiments, in the control region of the radio signal, the redundant control message and the at least one further redundant control message are offset relative to the specific control message
in time so as to define a comb structure, or
in frequency so as to define a n-offset structure, n being the number of redundant control messages in the radio signal, or
in time and frequency so as to define a tree structure.

In accordance with embodiments, based on a signal quality of a signal at a child node of the tree structure, the receiver is configured to follow a decoding path in the tree with the highest key performance indicator, KPI, thereby needing only log k decoding attempts for k redundancy versions. The KPI can be calculated based on the signal quality and/or other parameters.

In accordance with embodiments, the control message is located in the frequency domain, in the time domain or in the spatial domain according to a binary tree structure, wherein two or more redundancy versions of the control message are stored in respective child nodes, and the offset is indicated by a corresponding root/father-node.

In accordance with embodiments, the receiver is configured to detect one or more further signals from one or more of the further locations in the radio signal until the detected control message is determined to be the specific control message, or until a predefined number of detection attempts is reached, or after a predefined timer has expired.

In accordance with embodiments, the receiver is configured to detect the signal from the other location and the further signal from the at least one further location in the radio signal sequentially or in parallel.

In accordance with embodiments,
the radio signal is part of a downlink, DL, communication from a transmitter, like a base station, to the receiver,
the control message comprises a DCI message,
the radio signal comprises a downlink frame,
the downlink frame comprises at least one physical downlink control channel, PDCCH, region as the control region, the PDCCH region including a plurality of PDCCHs, each carrying a DCI message or a redundant DCI message, and the receiver is configured to detect a control message from the radio signal and from the signal at the other location using a blind detection based on the control message's CRC and the receiver's RNTI.

In accordance with embodiments,
the radio signal is part of a sidelink, SL, communication from a transmitter, like a user equipment, to the receiver,
the control message comprises a SCI message,
the radio signal comprises sidelink frame,
the downlink frame comprises at least one physical sidelink control channel, PSCCH, region as the control region, the PSCCH region including a plurality of PSCCHs, each carrying a SCI message or a redundant SCI message, and
the receiver is configured to detect a control message from the radio signal and from the signal at the other location using a blind detection based on the control message's CRC and the receiver's RNTI.

In accordance with embodiments, the control message is located in the PDCCH or the PSCCH includes one or more control-channel elements, CCEs within a control-resource set, CORESET.

Transmitter

The present invention provides a transmitter,
wherein the transmitter is configured to serve a plurality of receivers of a wireless communication system, and
wherein the transmitter is configured to provide a radio signal, the radio signal including for the plurality of receivers served by the transmitter a plurality of control messages and a redundant control message for at least one of the control messages.

The present invention provides a method, comprising:
serving a plurality of receivers of a wireless communication system by a transmitter, and
sending, by the transmitter, a radio signal, the radio signal including for the plurality of receivers served by the transmitter a plurality of control messages and a redundant control message for each of the control messages.

In accordance with embodiments, a specific receiver determines a control message detected from the radio signal as a specific control message for the specific receiver based on a signal from another location in the radio signal.

In accordance with embodiments, the radio signal includes at least one further redundant control message for a control message.

Wireless Communication System

The present invention provides a wireless communication system, comprising:
one or more receivers accordance with the present invention, and
one or more transmitters accordance with the present invention.

The present invention provides a method, comprising:
serving a plurality of receivers of a wireless communication system by a transmitter,
sending, by the transmitter, a radio signal, the radio signal including for the plurality of receivers served by the transmitter a plurality of control messages and a redundant control message for each of the control messages
detecting a control message from the radio signal,
responsive to detecting the control message, detecting a signal from another location in the radio signal, and
determining the detected control message as a specific control message for the receiver based on the signal detected from the other location.

In accordance with embodiments, the wireless communication system includes
- a terrestrial network, or
- a non-terrestrial network, or
- networks or segments of networks using as a receiver an airborne vehicle or a spaceborne vehicle, or
- a combination thereof.

In accordance with embodiments,
the receiver comprises one or more of:
- a mobile or stationary terminal,
- an IoT device,
- a ground based vehicle,
- an aerial vehicle,
- a drone,
- a building, or
- any other item or device provided with network connectivity enabling the item/device to communicate using the wireless communication system, like a sensor or actuator, and the transmitter comprises one or more:
- a macro cell base station, or
- a small cell base station, or
- a spaceborne vehicle, like a satellite or a space, or
- an airborne vehicle, like a unmanned aircraft system (UAS), e.g., a tethered UAS, a lighter than air UAS (LTA), a heavier than air UAS (HTA) and a high altitude UAS platforms (HAPs), or
- any transmission/reception point (TRP) enabling an item or a device provided with network connectivity to communicate using the wireless communication system.

In accordance with embodiments, using an Inverse Fast Fourier Transform, IFFT, based signal, wherein the IFFT based signal includes OFDM with CP, DFT-s-OFDM with CP, IFFT-based waveforms without CP, f-OFDM, FBMC, GFDM or UFMC.

Computer Program Product

The present invention provides a computer program product comprising instructions which, when the program is executed by a computer, cause the computer to carry out the one or more methods of in accordance with the present invention.

Figure 2:
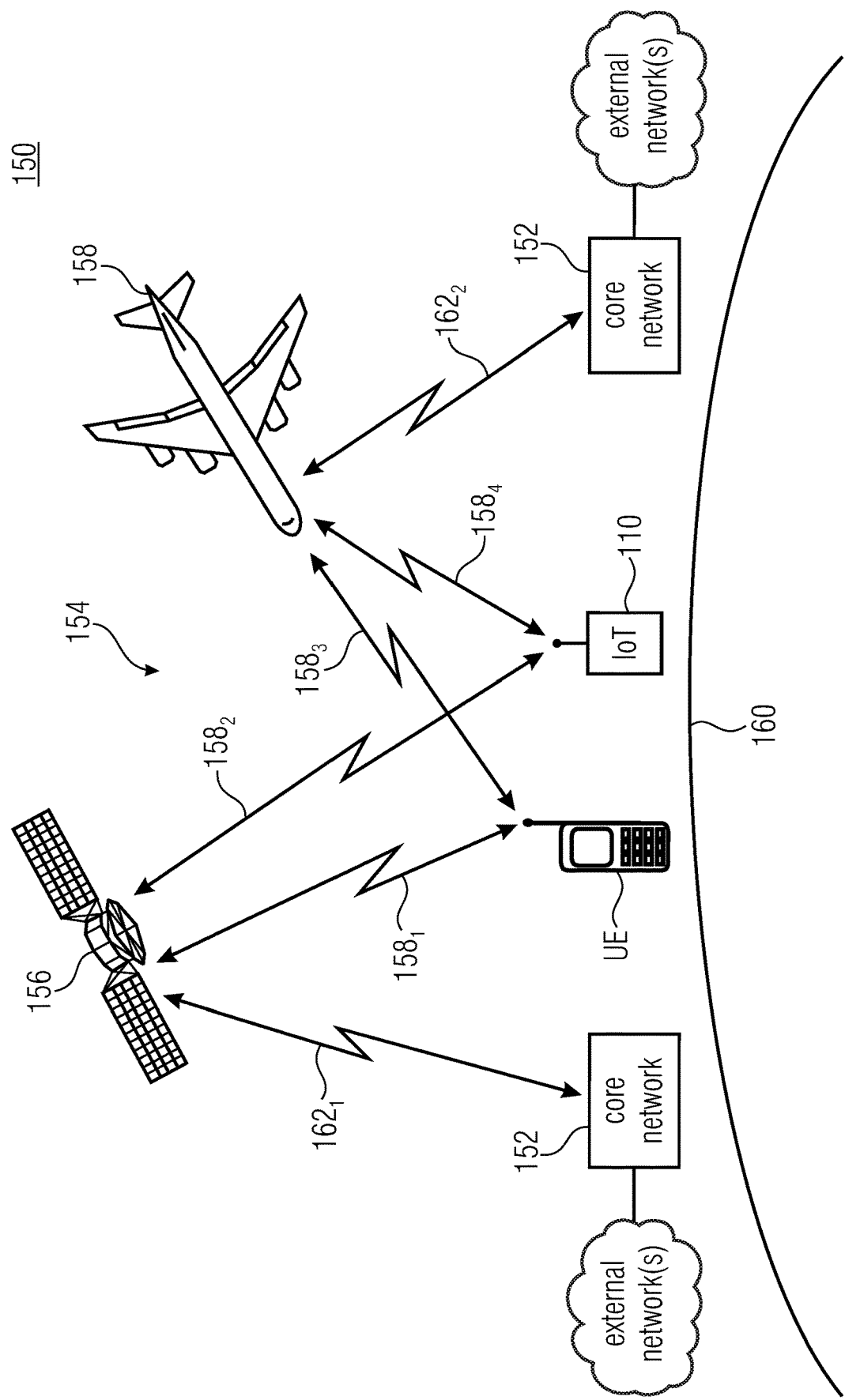
FIG. 2 is a schematic representation of an example of a non-terrestrial wireless communication network.
Figure 3:
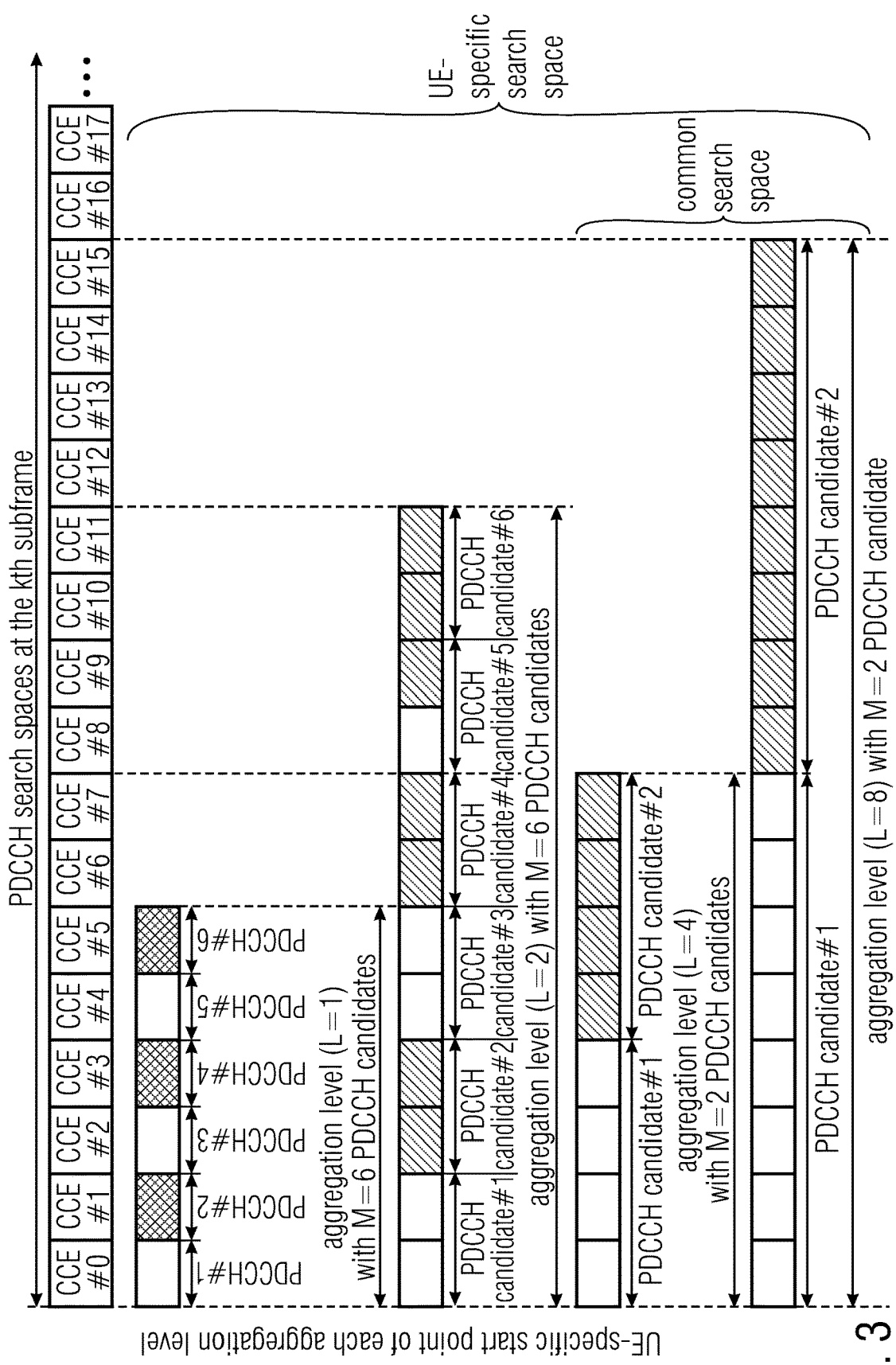
FIG. 3 schematically illustrates an example of a PDCCH region having a plurality of PDCCHs formed of different numbers of control-channel elements, CCEs.
Figure 5:
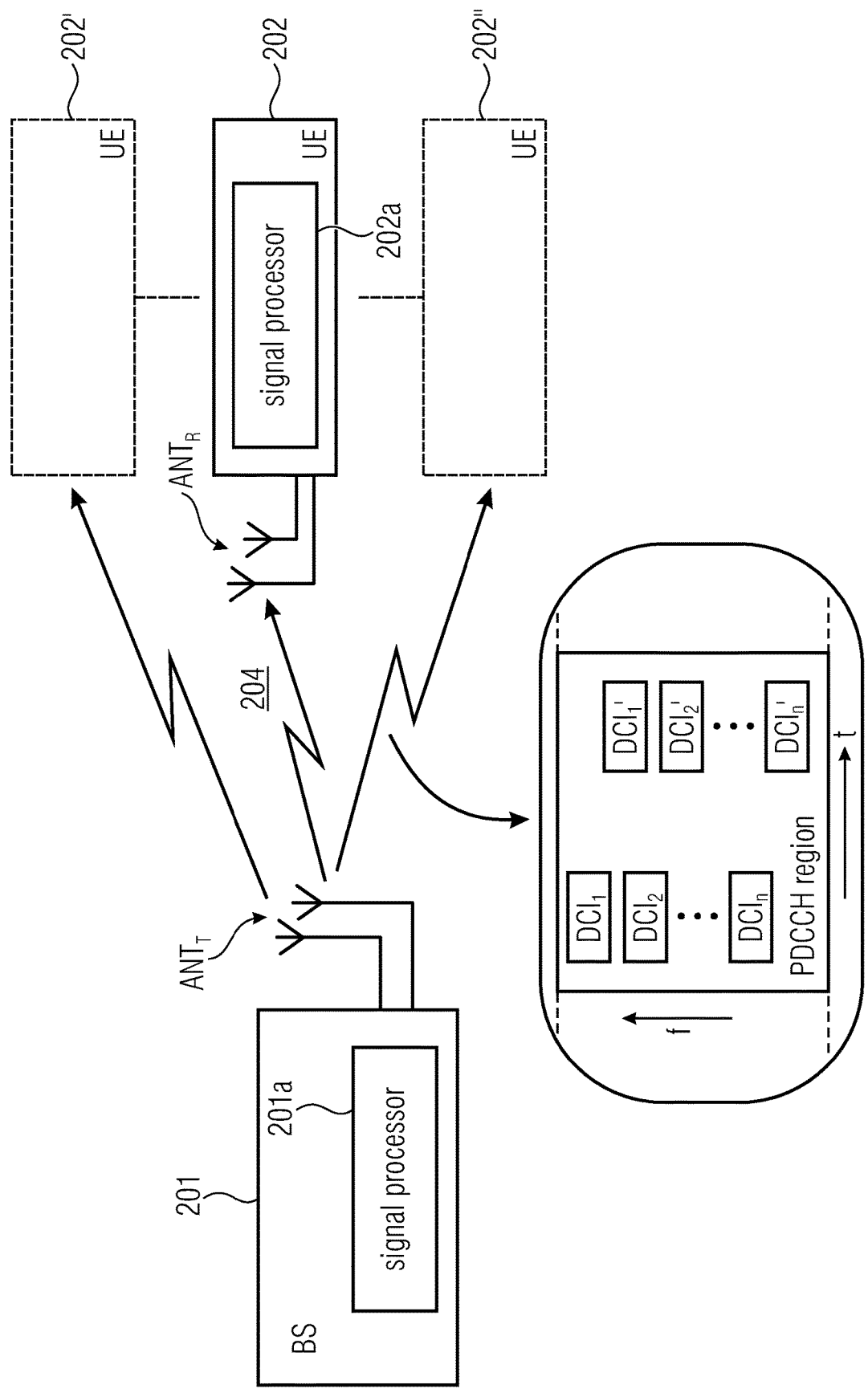
FIG. 5 is a schematic representation of a wireless communication system for communicating information between a plurality of transmitters and a plurality of UEs operating in accordance with the present invention.

Embodiments of the present invention may be implemented in the wireless communication system or network as depicted in FIG. 1 or in FIG. 2 including transmitters or transceivers, like base stations, and receivers or users, like mobile or stationary terminals or IoT devices, as mentioned above. FIG. 5 is a schematic representation of a wireless communication system for communicating information between a transmitter 201, like a base station, and a plurality of receivers 202, 202', 202", like UEs, which are served by the base station 201. The base station 201 and the UEs 202 may communicate via a wireless communication link or channel 204, like a radio link. The base station 201 includes one or more antennas ANTT or an antenna array having a plurality of antenna elements, and a signal processor 201a. The base station 201 may operate in accordance with the inventive teachings described herein. The UEs 202 include one or more antennas ANTR or an antenna array having a plurality of antenna elements, and a signal processor 202a. The respective UEs 202, 202' and 202" of FIG. 5 may operate in accordance with the inventive teachings described herein.

In accordance with an aspect of the inventive approach, a receiver 202 is provided. The receiver 202 receives, e.g., via its antenna ANTR, the radio signal 204 from the transmitter 201 of the wireless communication system. The transmitter 201 serves the plurality of receivers 202, 202', 202". The radio signal 204 includes for the plurality of receivers 202, 202', 202" served by the transmitter 201 a plurality of control messages $DCI_1$ to $DCI_n$, and a redundant control message $DCI_1'$-$DCI_n'$ for at least one of the control messages $DCI_1$-$DCI_n$. In accordance with embodiments, redundant control messages may be provided for a plurality or for all of the control messages. In accordance with other embodiments, the radio signal 204 may include one or more control messages for which no redundant control message is provided, for example for legacy UEs or receivers not operating in accordance with the inventive approach. The receiver 202, e.g., using its signal processor 202a, detects a control message DCI from the radio signal 204. Responsive to the detecting of the control message DCI, the receiver 202 detects from another location in the radio signal a signal. The receiver 202 determines the detected control message DCI as a specific control message for the receiver based on the signal detected from the other location.

In accordance with another aspect of the inventive approach, a transmitter 201 is provided. The transmitter 201 serves a plurality of receivers 202, 202', 202" of the wireless communication system. The transmitter 201, e.g., using its signal processor 201a, provides the radio signal 204 which includes for the plurality of receivers 202, 202', 202" served by the transmitter 201 a plurality of control messages $DCI_1$-$DCI_n$ and a redundant control message $DCI_1'$-$DCI_n'$ for at least one of the control messages. Also with regard to the transmitter it is noted that, in accordance with embodiments, redundant control messages may be provided for a plurality or for all of the control messages. In accordance with other embodiments, the radio signal 204 may include one or more control messages for which no redundant control message is provided, for example for legacy UEs or receivers not operating in accordance with the inventive approach.

Thus, in accordance with the inventive approach a predefined number of duplicated packets of the same control message, also referred to as DCI or DCI message in the following, is sent for the same UE. The original packet and the duplicated packet may be sent in the same PDCCH region having, for example, a predefined duration in the time domain and spanning a plurality of subcarriers in the frequency domain. In accordance with other embodiments, the packet and its duplicated version may be sent in different PDCCH regions, for example the original packet may be sent in a first PDCCH region of a specific duration spanning a first number of carriers in the frequency domain, while the duplicated packet may be sent in a second PDCCH region having the same or a different duration in the time domain and spanning a different set of subcarriers in the frequency domain. In accordance with yet other embodiments, the second PDCCH region may be in another spatial domain, e.g., the first PDCCH region may be part of a transmission transmitted from a one or more first antennas of a transmitter, like a base station, and the second PDCCH region may be part of a transmission transmitted from one or more second antennas of the transmitter. The codeword in the second PDCCH region can be send using any spatial diversity technique, such as space-time or space-frequency block codes, e.g. using schemes such as Alamouti coding utilizing the complex conjugate or negative complex conjugate of the original codeword transmitted in the first PDCCH region.

A duplicate packet of a DCI message may comprise a packet including redundant information but having a smaller or equal or larger packet size than the original DCI message or DCI packet. The duplicated packet, in accordance with embodiments, may be an exact copy of the packet with identical content and using the same or different encoding scheme, or it may be a packet of the same or different size of the original packet containing redundant information with respect to the initial packet. For example, when including redundant information, the redundant control message may include a certain redundancy version of the control message to provide for an incremental redundancy, or it may include an error correction code for the control message as originally sent. In accordance with other embodiments, the relevant control message, as mentioned above, may be a duplicate of the control message.

The inventive approach, by sending the duplicate packages, lowers the false positive detection probability. For example, the DCI message detected and the signal detected at the known location in the radio signal may be combined. For example, when combining the detected DCI message and the signal from the other location into a combined DCI message, the signal quality of the combined DCI message is higher than the signal quality of the detected DCI message in case the signal represents data related to the detected DCI message, and the detected DCI message is considered an true-positive or valid DCI message for the detecting UE. On the other hand, in case the signal does not represent data related to the detected DCI message, the signal quality of the combined signal is lower than the signal quality of the detected DCI message, and the detected DCI message is considered an false-positive or invalid DCI message for the detecting UE. Signal quality can be measured by the associated path probabilities in trellis-based (e.g. Viterbi) or successive cancellation-based decoders or the convergence behavior in belief-propagation-based decoders, e.g., Sum-Product, Min-Sum and Turbo-Decoders.

In accordance with other embodiments, it may be judged whether combining the DCI message and the signal from the other location into the combined DCI message forms a decodable message at the UE, which indicates a valid DCI message, whereas a combined DCI message not being decodable at the UE indicates an invalid DCI message for the UE. Not being decodable means that the CRC check of the combined message is invalid in contrary to the CRC check of the false-positive DCI.

In accordance with yet further embodiments, for example when using a duplicate of the original DCI message, instead of combining the detected DCI message and the signal from the other location, a correlation of the detected DCI message and the signal from the other location may be performed. A high correlation value, e.g., being equal to or exceeding a predefined threshold, indicates that the DCI message and the signal from the other location relate to the same DCI message so that the DCI message is judged to be true-positive or valid, whereas a low correlation value, e.g., being below the predefined threshold, indicates that the DCI message and the signal from the other location are not related with each other so that the detected DCI message is considered a false-positive or invalid DCI message for the decoding UE.

When the signal obtained from the further location includes data representing the duplicate packet of the detected DCI message, the UE may combine both DCI packets or transmissions to achieve, for example, a lower code rate and a frequency diversity without introducing a new DCI format using, for example, a large CRC. Thus, the inventive approach, by sending the duplicate packages may also lower the missing probability.

Figure 4:
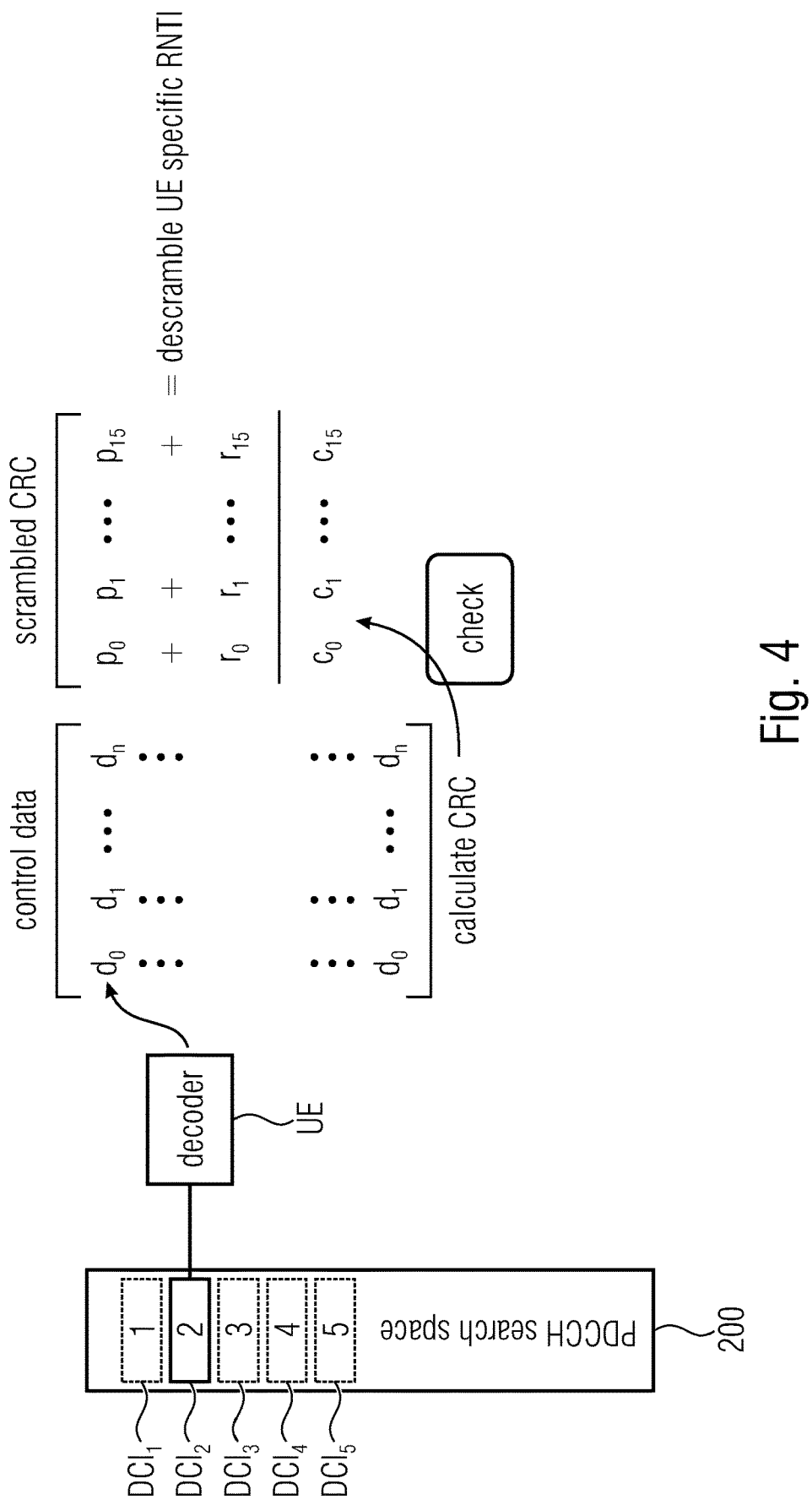
FIG. 4 schematically illustrates the blind decoding process to find within the PDCCH region one or more DCI packages for a specific UE.

The above summarized functionality of embodiments of the inventive approach will now be described in more detail with reference to FIGS. 6(*a*)-(*b*) which shows a mapping between two PDCCH regions and how a UE combines a DCI and a signal from the respective regions for determining whether a DCI for the UE is valid or not. FIG. 6(*a*) illustrates a scenario in which the UE accepts a DCI message as a valid DCI message, and FIG. 6(*b*) illustrates a scenario in which a UE rejects a DCI message as a false-positive DCI message which is not a DCI message for the UE. In FIGS. 6(*a*)-(*b*), it is assumed that the original DCI message is transmitted in a first PDCCH region 200, and the duplicate version is transmitted in a second PDCCH region 200'. In accordance with other embodiments, the DCI messages and the duplicates thereof may also be transmitted in the same PDCCH region. In FIG. 6(*a*), the UE detects from the first PDCCH region 200 a DCI message 210, for example by performing a blind decoding of all the DCI messages in the PDCCH region 200 in a way as described above with reference to FIG. 4. Responsive to the detecting of the first DCI message 210 from the first region 200, the UE reads a signal from a second location or region 212 in the second PDCCH region 200' at which a redundant version or a duplicate of the DCI message 210 is located. The UE knows the location 212 of the duplicate version, however, decoding at this part may fail, for example due to a bad signal in view of noise or interference on the channel. Nevertheless, some signal is obtained from the location or region 212 which includes or represents data or information associated with the duplicate of the DCI message 210. Therefore, when combining the DCI message 210 detected from the first region 200 and the signal from region 212 in the second control region 200', the combined message will be decodable for the UE or will have a signal quality that is increased when compared to the signal quality of the detected DCI message 210 only. Therefore, the UE recognizes the combined DCI message as a valid or true-positive DCI message for the UE. Naturally, in case the DCI message is PDCCH region 200' can be detected and decoded, but not the DCI message in PDCCH region 200, the same approach as mentioned above applies, i.e., the UE can still determine whether the detected DCI message from region 200' is valid.

In FIG. 6(*a*) the DCI 210 and the area 212 in the respective PDCCH regions 200, 200' are indicated at a position offset from an upper/lower border of the respective region, and the UE knows, due to the offset which is signaled to the UE what data from the respective PDCCH region is to be combined into the combined DCI message 214.

FIG. 6(*b*) shows a scenario in which a UE recognizes a false-positive DCI message. The UE erroneously detects from the PDDCH region 200 a DCI message 216 which is actually not intended for the UE. Responsive to the detecting of the DCI message 216, the UE, on the basis of the known offset, reads a signal from region 212 from the second PDCCH region 200'. The detected DCI message 216 and the signal from area 212 are combined into the combined DCI message 214. However, in case the UE is preconfigured with the location of its duplicate DCI message in the radio signal, the signal at area 212 related to a DCI message that is different from the detected DCI message 216. In case the detected DCI message 216 includes the information where its duplicate may be found, the UE detecting the signal from the area 212 will not be able to detect any meaningful information from this location because the duplicate DCI message is associated with a RNTI of a different UE. In either case, the signal from the area 212 will not provide any information related to the DCI message 216 so that, when combined with the DCI message 216, a signal quality of the combined message is lower than the signal quality of the DCI message 216 or the combined message may not be decodable, and the UE to recognize the DCI message 216 as a false-positive DCI message and rejects the DCI message.

In the embodiments described with reference to FIG. 6(a) and FIG. 6(b) it has been assumed that the duplicate DCI messages include some redundancy information which, when combined with the DCI allows for a judgement as to whether the combined DCI message is valid or not. When using duplicates of the control messages, in accordance with other embodiments, a correlation of the detected DCI message 210, 216 and the signal from the other region 212 may be performed to determine the validity of a combined DCI message.

Figure 6B:
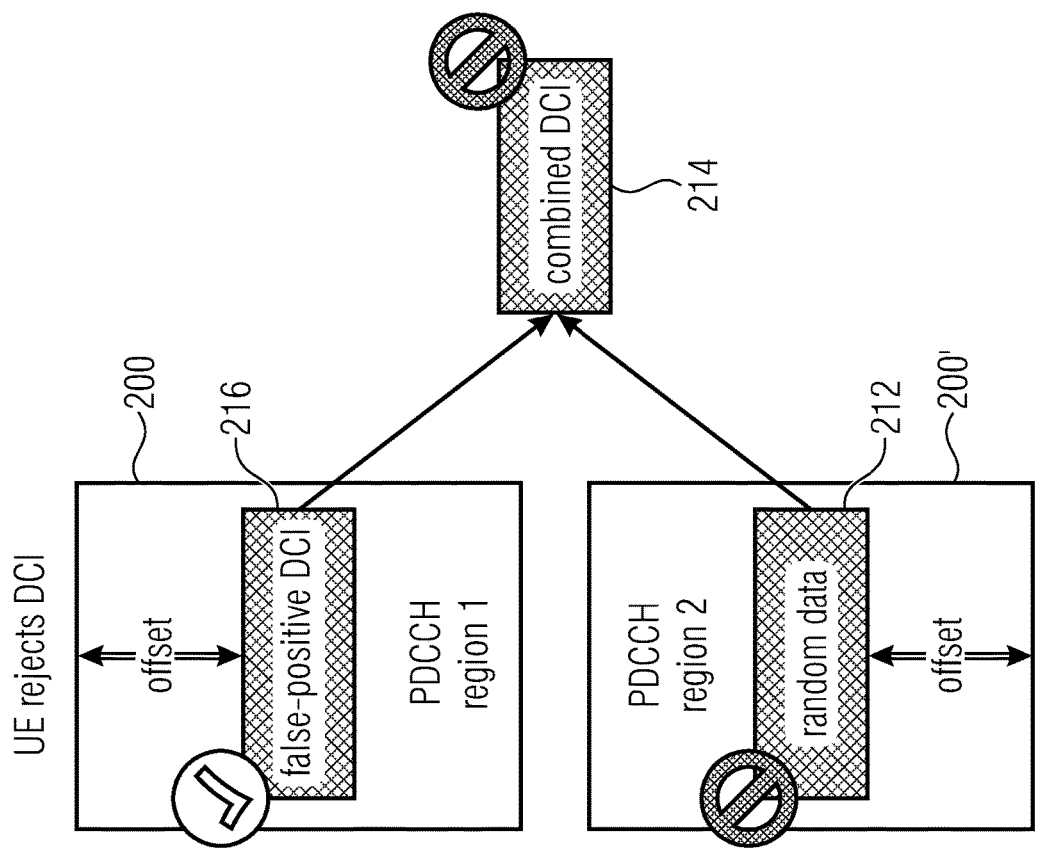
Figure 6A:
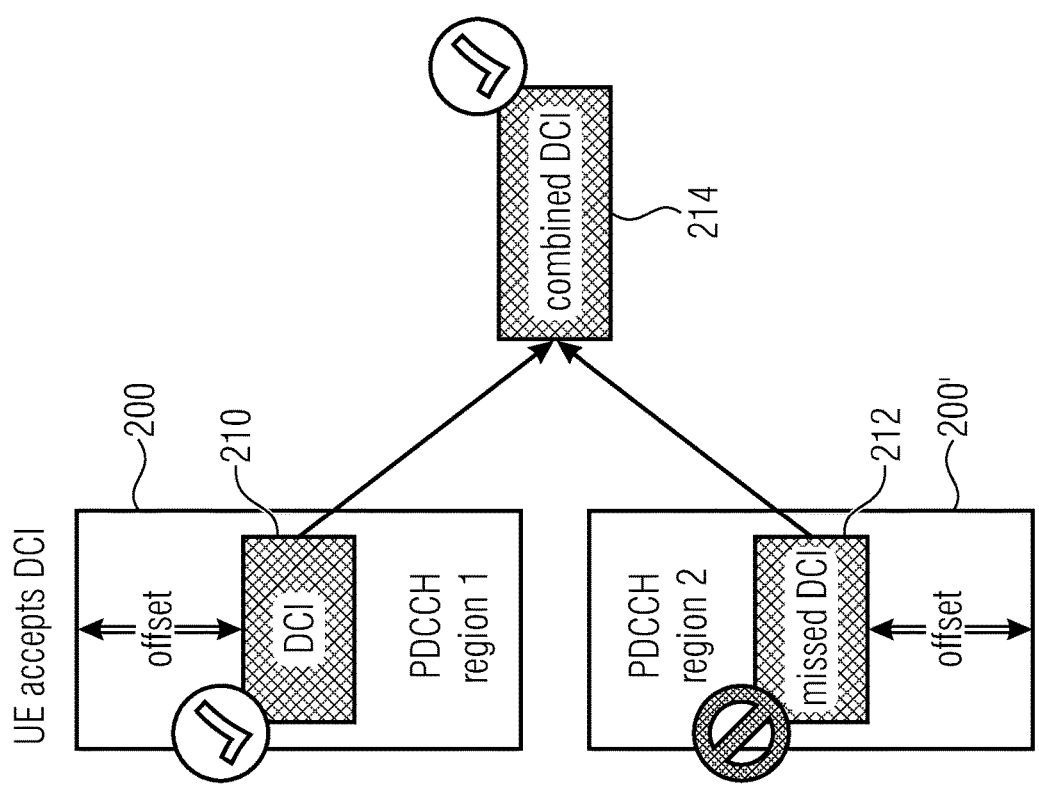

As described above, the UE is aware of a location of its duplicate or redundant DCI message, and the base station may configure an offset, for example with reference to a border of the PDCCH region 200, 200' in a way as depicted in FIGS. 6(a)-(b). The UE may be aware of positions of transmission of duplicates of its DCI message relative to the other transmissions. The location of the duplicate, like the offset, may be preconfigured using, for example, RRC signaling. For example, when considering the embodiment described with reference to FIG. 6(a) and FIG. 6(b), the UE detecting the DCI messages using blind detecting, due to the pre-configuration of the offset, is aware of a position where to look for the redundant control message. In the embodiment of FIG. 6(a), in case the UE detects a valid DCI message from the first PDCCH region 200', the signal the UE may retrieve from the known location is also associated with the detected DCI message, whereas in FIG. 6(b) the signal from the location 212 in the second PDCCH region 200' is not related to the DCI message 216.

In accordance with yet other embodiments, rather than preconfiguring the offset, the DCI message itself may include the information about the location, like the offset. A new DCI field may be included into the DCI message indicating, e.g., the duplication offset in a number of CCEs from a border of a PDCCH region. The size of the offset may depend on the aggregation level and bandwidth. FIG. 7 illustrates a DCI format message based on a known DCI format 1 message modified in accordance with an embodiment and in which the second entry or field indicates the duplication offset. In accordance with other embodiments, the number of CCEs or another indication of the offset may be signaled, or an indication of a specific preconfigured offset may be included, like an index referring to one of a plurality of preconfigured offsets know at the UE. This approach achieves the same effects as described above with reference to FIG. 6(a) and FIG. 6(b) while increasing the flexibility of DCI scheduling.

Figure 8:
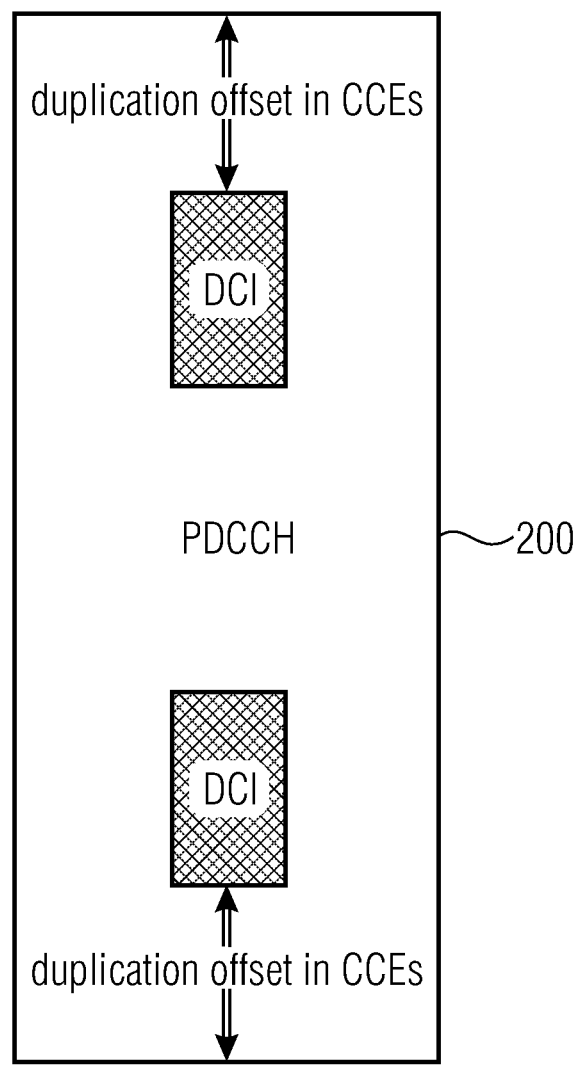
FIG. 8 illustrates an embodiment in accordance with which the DCI message and its duplicate are within the same PDCCH region.

FIG. 8 illustrates an embodiment in accordance with which the DCI message and its duplicate are within the same PDCCH region 200, e.g., with the same offset which may be indicated in the DCI message itself or with which the UE may be preconfigured.

Figure 9A:
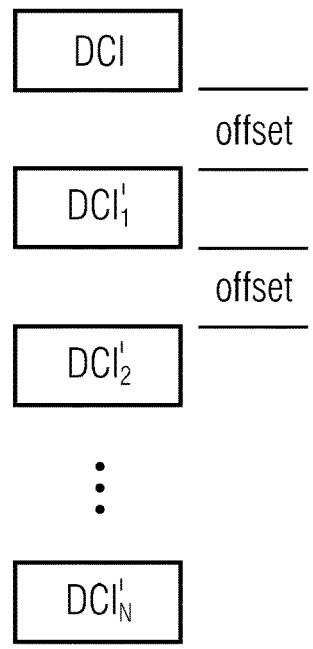
Figure 9B:
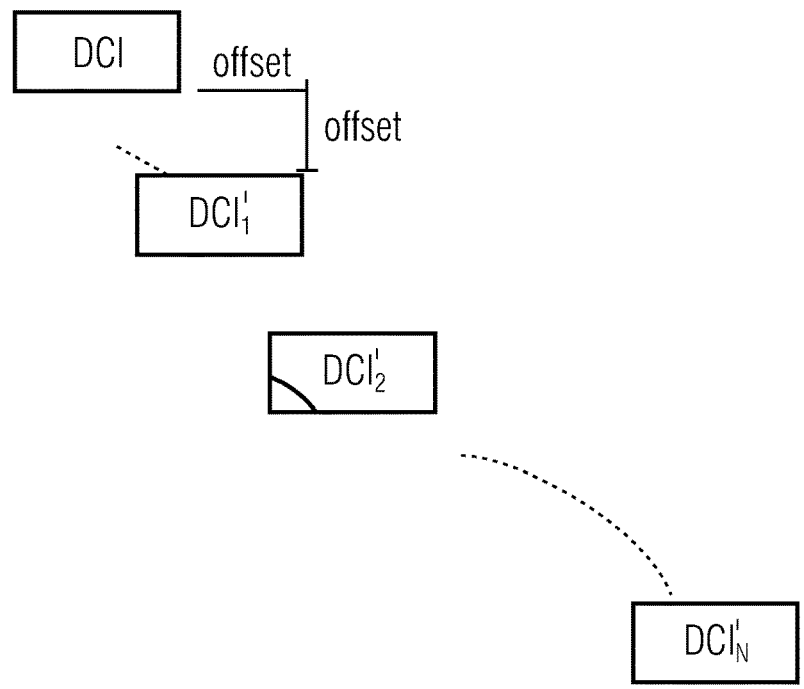

In accordance with other embodiments, the present invention is not limited to only a single duplicate packet of the DCI message, rather, the DCI redundancy can be further enhanced by signaling n duplicates, n=1, 2, 3, . . . N. The duplicates may be arranged in a comb structure, as shown in FIG. 9(a) or in an n-offset structure as shown in FIG. 9(b), with variable or fixed offsets. In the comb structure the DCI duplicates may be located at offsets in the time or frequency domain only, whereas in the n-offset structure the duplicates may be located with an offset in time and frequency.

Figure 10A:
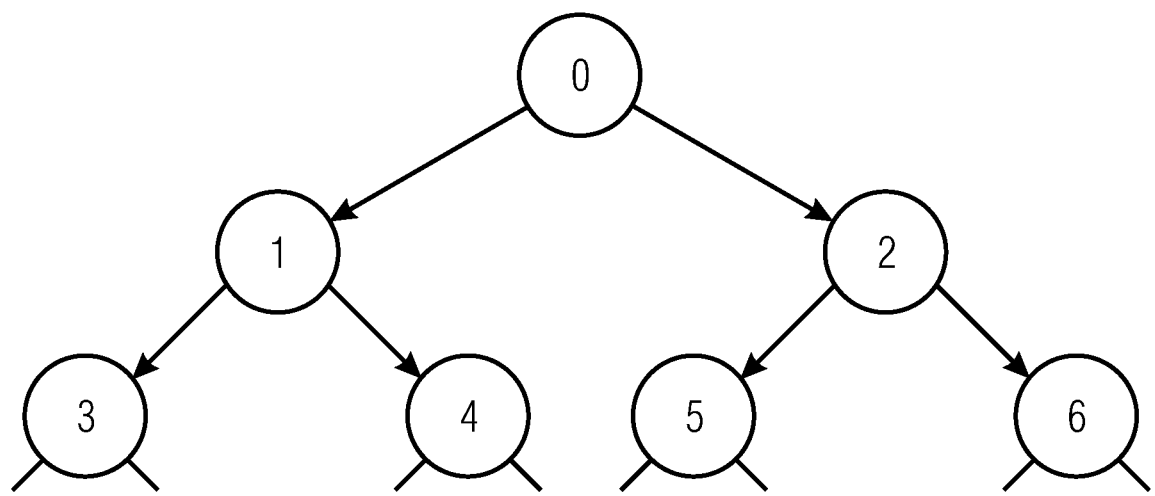
FIG. 10(a)-FIG. 10(b) illustrates embodiments for arranging multiple duplicates of the control message in the control region in accordance with a tree structure as shown in FIG. 10(a) or in accordance with a tree structure as shown in FIG. 10(b)
Figure 10B:
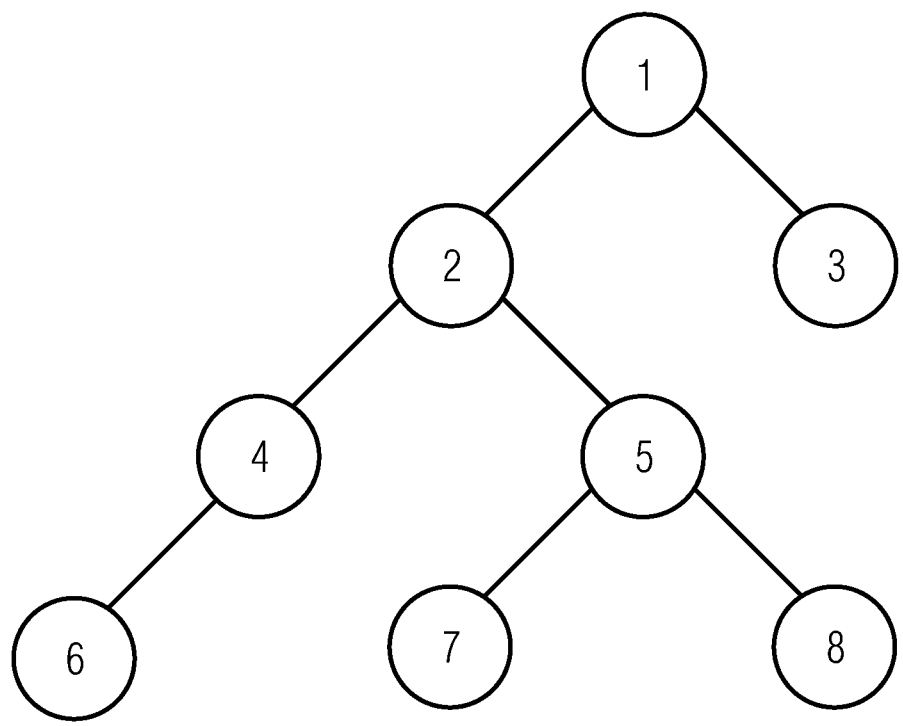

In accordance with yet other embodiments, the n duplicates may be arranged in accordance with tree structures as shown in FIG. 10(a) and FIG. 10(b). The control message is located in the frequency domain, in the time domain or in the spatial domain according to a binary tree structure, wherein the original control message is stored in a root node and the plurality of redundancy versions of the control message are stored in respective child nodes. The offset may be indicated by a corresponding root/father-node. Based on a signal quality of a signal at a child node of the tree structure, the receiver may follow a decoding path in the tree with the highest key performance indicator, KPI, thereby needing only log k decodings/detections for k redundancy versions and thus improve the speed of the blind search of the UE by limiting the search space within the DCI.

Figure 11:
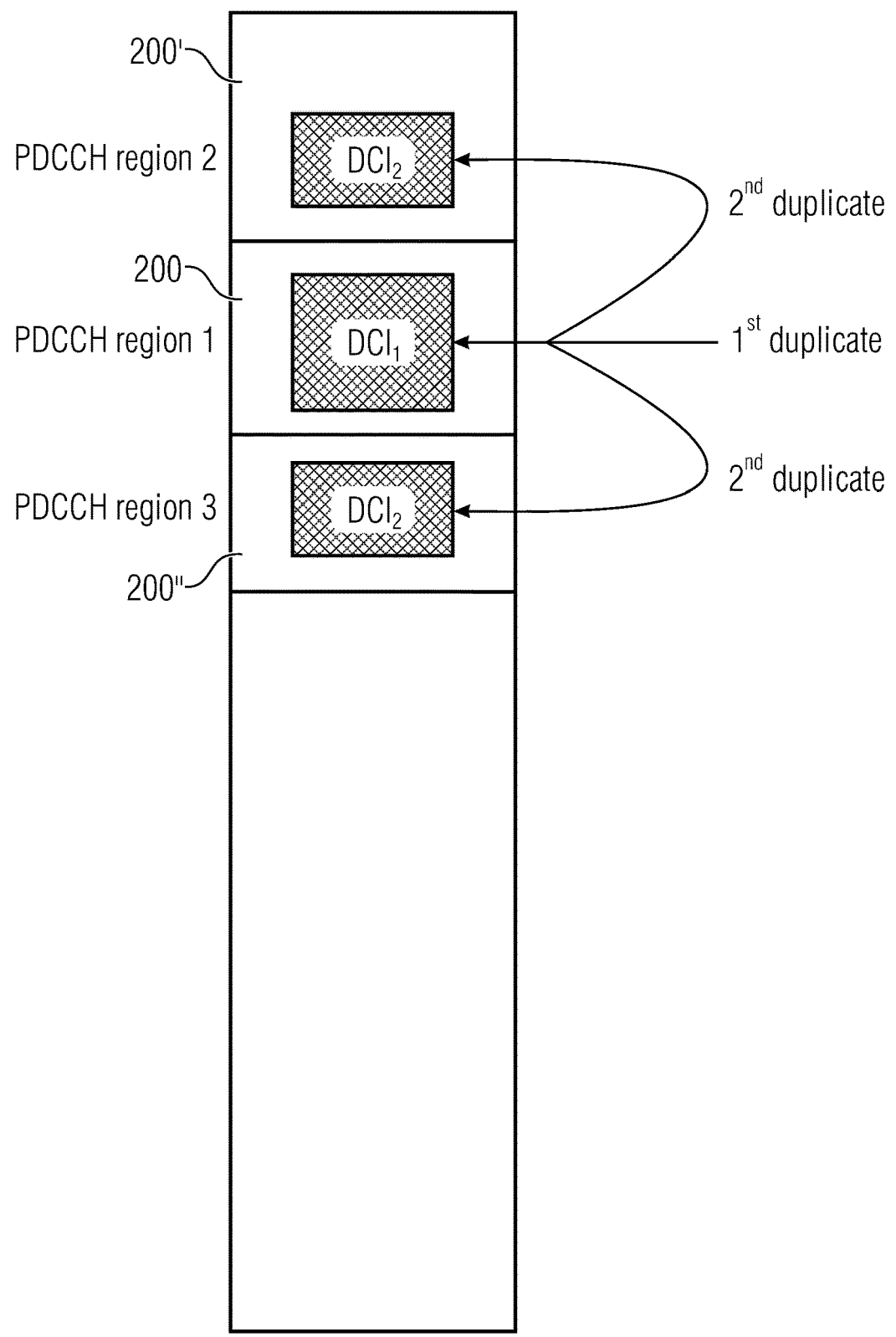
FIG. 11 illustrates the decoding of three duplicates in a common search space.

In accordance with embodiments, the UE may detect or decode the respective DCI messages and their duplicates sequentially or using x≤n parallel decoding processes depending on the decoding capabilities/capacity of the UE and combine the DCIs accordingly thereby reducing the detection of false positives even further. When placing the redundant DCIs according in a tree structure within the PDCCH region, this may reduce the speed of detecting DCIs within the search space to O(log n), where n is the size of the search space, and dependent on the latency requirements and decoding success, the UE may utilize the search space accordingly and only check blind detects/decodes in log n offset steps, as is schematically depicted in FIG. 11.

In accordance with the embodiments described above, the radio signal is part of a downlink, DL, communication from a transmitter, like a base station, to the receiver. In such a scenario the control message may be a DCI message, the radio signal comprises a downlink frame, the downlink frame comprises at least one physical downlink control channel, PDCCH, region as the control region, the PDCCH region including a plurality of PDCCHs, each carrying a DCI message or a redundant DCI message, and the receiver detects a control message from the radio signal and from the signal at the other location using a blind detection based on the control message's CRC and the receiver's RNTI.

However, the inventive approach is not limited to a DL communication. In accordance with other embodiments, the radio signal may be part of a sidelink, SL, communication from a transmitter, like a user equipment, to the receiver as it may occur in a V2V or a V2X or a D2D communication. In such a scenario the control message may be a SCI message, the radio signal comprises sidelink frame, the downlink frame comprises at least one physical sidelink control channel, PSCCH, region as the control region, the PSCCH region including a plurality of PSCCHs, each carrying a SCI message or a redundant SCI message, and the receiver is configured to detect a control message from the radio signal and from the signal at the other location using a blind detection based on the control message's CRC and the receiver's RNTI.

In accordance with embodiments, the control message may be located in the PDCCH or the PSCCHH and includes one or more control-channel elements, CCEs, within a control-resource set, CORESET.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 12:
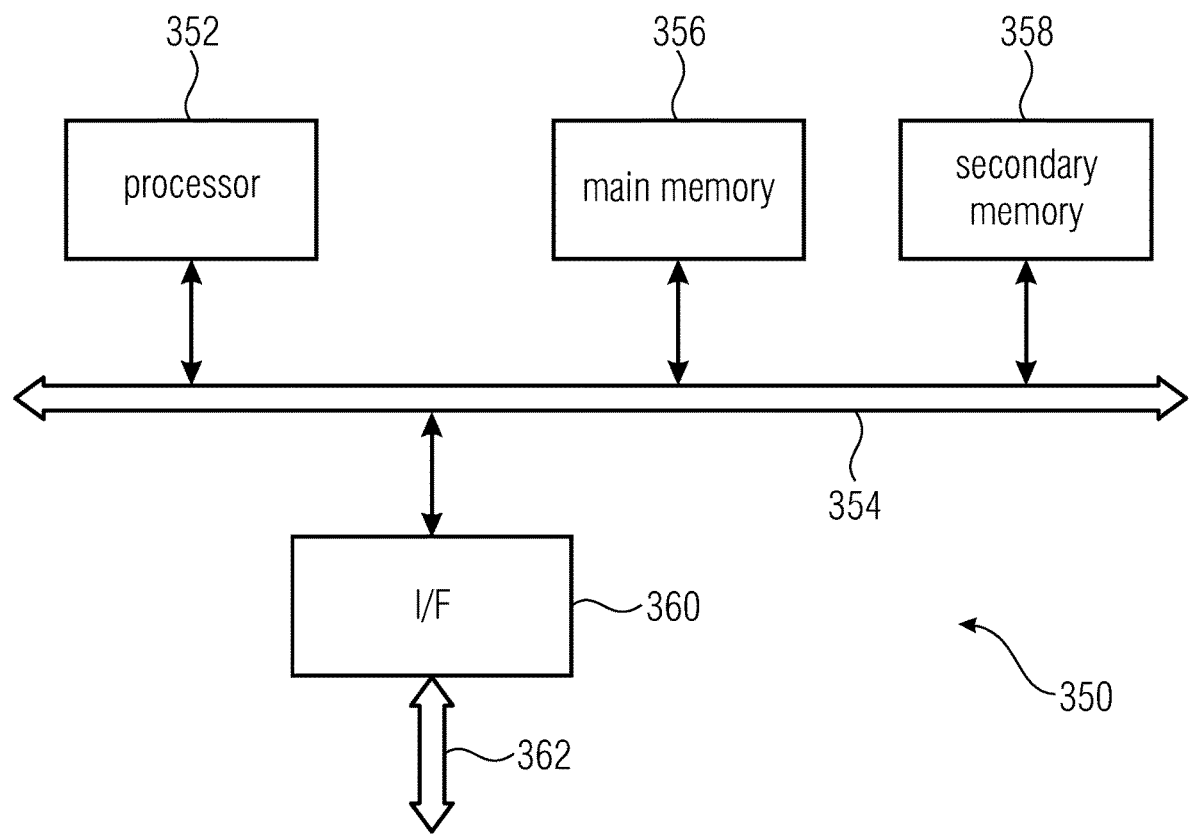
FIG. 12 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A receiver for a wireless communication system, the receiver comprising:
    one or more antennas or an antenna array having a plurality of antenna elements for receiving a radio signal from a transmitter of the wireless communication system, the radio signal comprising for the receiver and for one or more further receivers served by the transmitter a plurality of control messages and a redundant control message for one or more of the plurality control messages, and
    a signal processor for
    a detecting at least one of the plurality of control messages from a first part of a common control region of the radio signal or from a first control region of the radio signal,
    detecting, responsive to detecting the one control message, a signal from a certain location in the radio signal, the certain location being a second part of the common control region of the radio signal or a second control region of the radio signal, and
    determining the one control message as a specific control message for the receiver based on the signal detected from the certain location,
    wherein
    when the control message and the redundant control message are in the common control region of the radio signal, the certain location is indicated by an offset in time and/or frequency and/or spatial domain relative to the detected control message in the common control region, or relative to a border of the common control region, and when the control message is in the first control region of the radio signal and the redundant control message is in the second control region of the radio signal, the certain location is indicated by an offset in time and/or frequency and/or spatial domain relative to a border of the second control region.

2. The receiver of claim 1, wherein the redundant control message comprises
   a certain redundancy version of the control message to provide for an incremental redundancy, or
   an error correction code for the control message, or
   a duplicate of the control message.

3. The receiver of claim 1,
   wherein the radio signal comprises a first radio signal, which defines a first link between the transmitter and the receiver, and a second radio signal, which defines a second link between the transmitter and the receiver,
   wherein common control region is part of one of the first and second radio signals, or is part of both radio signals, and
   wherein the first control region is part one of the first and second radio signals, and the second control region is part of the other one of the first and second radio signals.

4. The receiver of claim 1, wherein the offset defines an offset in time and/or frequency and/or space, or defines an offset in a number of control message elements, each control message being formed of one or more control message elements.

5. The receiver of claim 1, wherein the receiver is preconfigured with the certain location, or wherein the certain location is indicated in the control message.

6. The receiver of claim 5, wherein the control message explicitly indicates the certain location or comprises a reference to one of a plurality of preconfigured locations.

7. The receiver of claim 1, wherein
   the radio signal comprises at least one further redundant control message for the one control message, and
   the signal processor detects from at least one further location in the radio signal a further signal, and determines the one control message as the specific control message for the receiver based on the signal detected from the certain location and/or based on the further signal detected from the at least one further location.

8. The receiver of claim 7, wherein the further redundant control message comprises
   a certain redundancy version of the control message to provide for an incremental redundancy, or
   an error correction code for the control message, or
   a duplicate of the control message.

9. The receiver of claim 8, wherein the redundant control message comprises a first redundancy version of the control message, and wherein respective further redundant control messages comprise respective further redundancy versions.

10. The receiver of claim 7, wherein, in the control region of the radio signal, the redundant control message and the at least one further redundant control message are offset relative to the specific control message
    in time so as to define a comb structure, or
    in frequency so as to define a n-offset structure, n being the number of redundant control messages in the radio signal, or
    in time and frequency so as to define a tree structure.

11. The receiver of claim 10, wherein, based on a signal quality of a signal at a child node of the tree structure, the receiver is configured to follow a decoding path in the tree with the highest key performance indicator, KPI, thereby needing only log k decoding attempts for k redundancy versions.

12. The receiver of claim 10, wherein the control message is located in the frequency domain, in the time domain or in the spatial domain according to a binary tree structure, wherein two or more redundancy versions of the control message are stored in respective child nodes, and the offset is indicated by a corresponding root/father-node.

13. The receiver of claim 7, wherein the receiver is configured to detect one or more further signals from one or more of the further locations in the radio signal until the detected control message is determined to be the specific control message, or until a predefined number of detection attempts is reached, or after a predefined timer has expired.

14. The receiver of claim 7, wherein the receiver is configured to detect the signal from the other location and the further signal from the at least one further location in the radio signal sequentially or in parallel.

15. The receiver of claim 1, wherein
   the radio signal is part of a downlink, DL, communication from the transmitter, which is a base station, to the receiver,
   the control message comprises a DCI message,
   the radio signal comprises a downlink frame,
   the downlink frame comprises at least one physical downlink control channel, PDCCH, region as the control region, the PDCCH region comprising a plurality of PDCCHs, each carrying a DCI message or a redundant DCI message, and
   the signal processor detects the one control message and the signal from the certain location using a blind detection based on the control message's CRC and the receiver's RNTI.

16. The receiver of claim 1, wherein
   the radio signal is part of a sidelink, SL, communication from the transmitter, which is a user equipment, to the receiver,
   the control message comprises a SCI message,
   the radio signal comprises sidelink frame,
   the downlink frame comprises at least one physical sidelink control channel, PSCCH, region as the control region, the PSCCH region comprising a plurality of PSCCHs, each carrying a SCI message or a redundant SCI message, and
   the signal processor detects the one control message from the radio signal and the signal at the certain location using a blind detection based on the control message's CRC and the receiver's RNTI.

17. The receiver of claim 1, wherein the control message is located in a PDCCH or a PSCCH and comprises one or more control-channel elements, CCEs, within a control-resource set, CORESET.

18. A transmitter,
   wherein the transmitter serves a plurality of receivers of a wireless communication system, and the transmitter comprising:
   one or more antennas or an antenna array having a plurality of antenna elements for providing a radio signal, the radio signal comprising for the plurality of receivers served by the transmitter a plurality of control messages and a redundant control message for one or more of the plurality of control messages, thereby allowing a specific receiver to determine at least one of
the plurality of control messages from the radio signal
as a specific control message for the specific receiver
based on a signal from a certain location in the radio
signal,
wherein
when the control message and the redundant control
message are in a common control region of the radio
signal, the certain location is indicated by an offset in
time and/or frequency and/or spatial domain relative to
the detected control message in the common control
region, or relative to a border of the common control
region, and
when the control message is in a first control region of the
radio signal and the redundant control message is in a
second control region of the radio signal, the certain
location is indicated by an offset in time and/or frequency and/or spatial domain relative to a border of the
second control region.

19. The transmitter of claim 18, wherein the radio signal comprises at least one further redundant control message for the one control message.

20. A wireless communication system, comprising:
at least one transmitter,
wherein the at least one transmitter serves a plurality of receivers of the wireless communication system, the transmitter comprising
one or more antennas or an antenna array having a plurality of antenna elements for providing a radio signal, the radio signal comprising for the plurality of receivers a plurality of control messages and a redundant control message for one or more of the plurality of control messages,
wherein at least one of the plurality of receivers comprises:
one or more antennas or an antenna array having a plurality of antenna elements for receiving the radio signal from the transmitter, and
a signal processor for
detecting at least one of the plurality of control messages from a first part of a common control region of the radio signal or from a first control region of the radio signal,
detecting, responsive to detecting the one control message, a signal from a certain location in the radio signal, the certain location being a second part of the common control region of the radio signal or a second control region of the radio signal, and
determining the one control message as a specific control message for the receiver based on the signal detected from the certain location, and
wherein
when the control message and the redundant control message are in the common control region of the radio signal, the certain location is indicated by an offset in time and/or frequency and/or spatial domain relative to the detected control message in the common control region, or relative to a border of the common control region, and
when the control message is in the first control region of the radio signal and the redundant control message is in the second control region of the radio signal, the certain location is indicated by an offset in time and/or frequency and/or spatial domain relative to a border of the second control region.

21. The wireless communication system of claim 20, wherein the wireless communication system comprises
a terrestrial network, or
a non-terrestrial network, or
networks or segments of networks using as a receiver an airborne vehicle or a spaceborne vehicle, or
a combination thereof.

22. The wireless communication system of claim 20, wherein
the receiver comprises one or more of:
a mobile or stationary terminal,
an IoT device,
a ground based vehicle,
an aerial vehicle,
a drone,
a building, or
any other item or device provided with network connectivity enabling the item/device to communicate using the wireless communication system, which is a sensor or actuator, and
the transmitter comprises one or more:
a macro cell base station,
a small cell base station,
a spaceborne vehicle, which is a satellite or a space,
an airborne vehicle, which is an unmanned aircraft system (UAS), wherein UAS comprises any of a tethered UAS, a lighter than air UAS (LTA), a heavier than air UAS (HTA) and a high altitude UAS platforms (HAPs), and
any transmission/reception point (TRP) enabling an item or a device provided with network connectivity to communicate using the wireless communication system.

23. A method, comprising:
receiving, at a receiver of a wireless communication system, a radio signal from a transmitter of the wireless communication system serving the receiver and one or more further receivers, the radio signal comprising for the receiver and for one or more further receivers a plurality of control messages and a redundant control message for one or more of the plurality of control messages,
detecting, by the receiver, at least one of the plurality of control messages from a first part of a common control region of the radio signal or from a first control region of the radio signal,
responsive to detecting the one control message, detecting, by the receiver, a signal from a certain location in the radio signal, the certain location being a second part of the common control region of the radio signal or a second control region of the radio signal, and
determining, by the receiver, the one control message as a specific control message for the receiver based on the signal detected from the certain location,
wherein
when the control message and the redundant control message are in the common control region of the radio signal, the certain location is indicated by an offset in time and/or frequency and/or spatial domain relative to the detected control message in the common control region, or relative to a border of the common control region, and
when the control message is in the first control region of the radio signal and the redundant control message is in the second control region of the radio signal, the certain location is indicated by an offset in time and/or frequency and/or spatial domain relative to a border of the second control region.

24. A non-transitory digital storage medium having a computer program stored thereon to perform the method of claim 23 when said computer program is run by a computer.

25. A method, comprising:
serving a plurality of receivers of a wireless communication system by a transmitter, and
sending, by the transmitter, a radio signal, the radio signal comprising for the plurality of receivers served by the transmitter a plurality of control messages and a redundant control message for one or more of the plurality of control messages,
wherein a specific receiver determines at least one of the plurality of control messages detected from the radio signal as a specific control message for the specific receiver based on a signal from a certain location in the radio signal, and
wherein
when the control message and the redundant control message are in a common control region of the radio signal, the certain location is indicated by an offset in time and/or frequency and/or spatial domain relative to the detected control message in the common control region, or relative to a border of the common control region, and
when the control message is in a first control region of the radio signal and the redundant control message is in a second control region of the radio signal, the certain location is indicated by an offset in time and/or frequency and/or spatial domain relative to a border of the second control region.

26. A non-transitory digital storage medium having a computer program stored thereon to perform the method of claim 25 when said computer program is run by a computer.

27. A method, comprising:
serving a plurality of receivers of a wireless communication system by a transmitter,
sending, by the transmitter, a radio signal, the radio signal comprising for the plurality of receivers served by the transmitter a plurality of control messages and a redundant control message for one or more of the plurality of control messages,
detecting, by one of the plurality of receivers, at least one of the plurality of control messages from a first part of a common control region of the radio signal or from a first control region of the radio signal,
responsive to detecting the one control message, detecting, by the one receiver, a signal from a certain location in the radio signal, the certain location being a second part of the common control region of the radio signal or a second control region of the radio signal, and
determining, by the one receiver, the one control message as a specific control message for the receiver based on the signal detected from the certain location,
wherein
when the control message and the redundant control message are in the common control region of the radio signal, the certain location is indicated by an offset in time and/or frequency and/or spatial domain relative to the detected control message in the common control region, or relative to a border of the common control region, and
when the control message is in the first control region of the radio signal and the redundant control message is in the second control region of the radio signal, the certain location is indicated by an offset in time and/or frequency and/or spatial domain relative to a border of the second control region.

28. A non-transitory digital storage medium having a computer program stored thereon to perform the method of claim 27 when said computer program is run by a computer.

* * * * *